US012561287B2

(12) United States Patent
Kraatz et al.

(10) Patent No.: US 12,561,287 B2
(45) Date of Patent: Feb. 24, 2026

(54) DUPLICATE FILE MANAGEMENT FOR CONTENT MANAGEMENT SYSTEMS AND FOR MIGRATION TO SUCH SYSTEMS

(71) Applicant: SHINYDOCS CORPORATION, Waterloo (CA)

(72) Inventors: Mark Kraatz, Waterloo (CA); Peter Vanleeuwen, Guelph (CA); Khalid Merhi, Kitchener (CA); Duan Bailey, Waterloo (CA); Tracy Grady, Kitchener (CA); Melanie Lurz, Kitchener (CA); Chris Landry, Kitchener (CA); Craig Treulieb, Kitchener (CA); Tyler Slaney, Kitchener (CA)

(73) Assignee: SHINYDOCS CORPORATION

( * ) Notice: Subject to any disclaimer, the term of this patent is extended or adjusted under 35 U.S.C. 154(b) by 334 days.

(21) Appl. No.: 17/805,939

(22) Filed: Jun. 8, 2022

(65) Prior Publication Data

US 2022/0391356 A1      Dec. 8, 2022

Related U.S. Application Data

(60) Provisional application No. 63/208,257, filed on Jun. 8, 2021.

(51) Int. Cl.
*G06F 16/174* (2019.01)
*G06F 16/13* (2019.01)

(52) U.S. Cl.
CPC ........ *G06F 16/1748* (2019.01); *G06F 16/137* (2019.01)

(58) Field of Classification Search
CPC ... G06F 16/1748; G06F 16/137; G06F 16/152
See application file for complete search history.

(56) References Cited

PUBLICATIONS

Petr Gazarov, What is an API? In English, please., Dec. 19, 2019, <URL: https://www.freecodecamp.org/news/what-is-an-api-in-english-please-b880a3214a82/> (Year: 2019).*

* cited by examiner

*Primary Examiner* — Tyler J Torgrimson

(57) ABSTRACT

In large installations of document management systems, files are often duplicated. Users may place their own copies of files in convenient locations, or for other reasons files may be unintentionally duplicated. Duplication of files causes many problems for systems reliant on document management, chiefly because the additional (identical) files accept extra storage space, and must be handled like all other files, which results in greater network and resource utilization (with a concomitant increase in processing, search and retrieval times). A tool to standardize the identification of duplicate files (based on their binary contents), as well as the identification of a primary duplicate (the original file) across multiple repositories in a manner that minimizes the time for identification is disclosed.

9 Claims, 5 Drawing Sheets

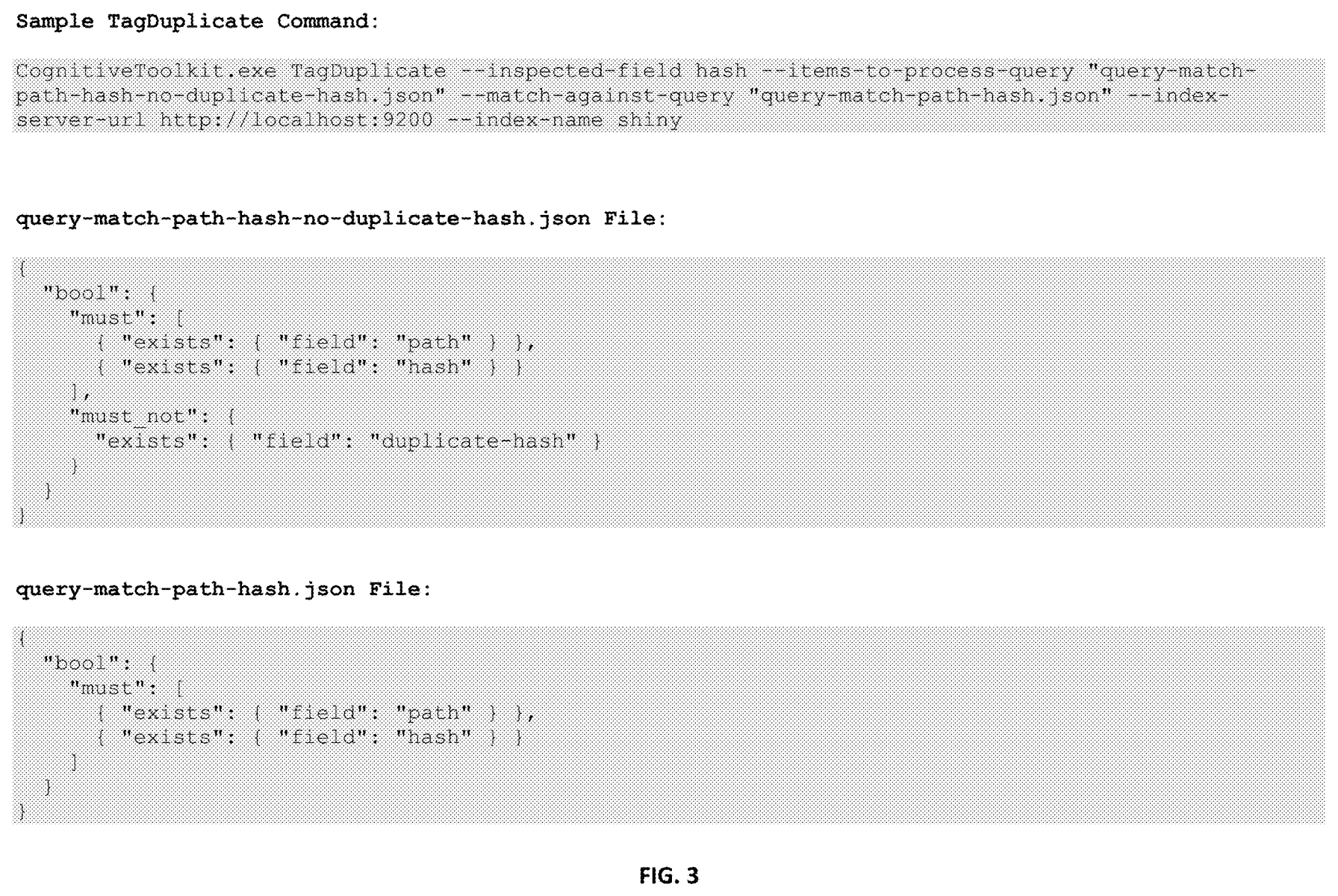

Sample TagDuplicate Command:

```
CognitiveToolkit.exe TagDuplicate --inspected-field hash --items-to-process-query "query-match-
path-hash-no-duplicate-hash.json" --match-against-query "query-match-path-hash.json" --index-
server-url http://localhost:9200 --index-name shiny
``` query-match-path-hash-no-duplicate-hash.json File:

```
{
  "bool": {
    "must": [
      { "exists": { "field": "path" } },
      { "exists": { "field": "hash" } }
    ],
    "must_not": [
      "exists": { "field": "duplicate-hash" }
    }
  }
}
``` query-match-path-hash.json File:

```
{
  "bool": {
    "must": [
      { "exists": { "field": "path" } },
      { "exists": { "field": "hash" } }
    ]
  }
}
```

FIG. 3

DUPLICATE FILE MANAGEMENT FOR CONTENT MANAGEMENT SYSTEMS AND FOR MIGRATION TO SUCH SYSTEMS

CROSS REFERENCE TO RELATED APPLICATION

The application claims priority and the benefit of U.S. Provisional Patent Application Ser. No. 63/208,257, entitled "DUPLICATE FILE MANAGEMENT FOR CONTENT MANAGEMENT SYSTEMS AND FOR MIGRATION TO SUCH SYSTEMS", filed on Jun. 8, 2021, this disclosure of which is incorporated herein by reference in its entirety.

FIELD

This disclosure relates to computer systems and, more specifically, to remote file storage and access.

BACKGROUND

Content management systems or enterprise content management systems are often used to store files and other data for access by users of an organization's computers.

Since the start of the digital revolution, organizations have been creating digital content at an accelerating pace without considering how to find, manage and action all these unstructured documents. At a mid-sized company, this can amount to hundreds of terabytes (TB) of data (which corresponds to hundreds of millions of documents). At a large-sized company, this can amount to petabytes (PB) of data (each petabyte corresponds to about a billion documents).

With documents scattered across multiple repositories (file shares, and/or proprietary solutions such as Open-Text™'s Content Server or Microsoft® 's SharePoint Online) it is very common for there to be many exact (binary) duplicates of any given file, sometimes as many as 10,000 copies, if not 100,000 or more. This is a big problem for these three reasons:

An organization may be faced with expensive infrastructure for storing all its content. Storing duplicate copies of documents is wasted storage, assuming there is only a requirement to store a given document only once (for most documents).

Many companies wish to get their content "under management", which usually involves a migration from a file system to a proprietary solution such as Open-Text™'s Content Server or Microsoft® 's SharePoint Online. If there is no need to migrate the same file more than once, it is important to be able to identify duplicate files so that duplicates are not migrated to the new repository (since this will save time and cost).

Many companies are interested in identifying the original or "primary" duplicate when presented with many duplicate files for a given file. Identifying this primary duplicate is further complicated when the duplicates are spread across multiple disparate repositories.

There is a desire for a tool to standardize the identification of duplicate files (based on their binary contents) as well as the identification of a primary duplicate (the original file) across multiple repositories in a manner that minimizes the time for identification.

SUMMARY

In large installations of document management systems, files are often duplicated. Users may place their own copies of files in convenient locations, or for other reasons files may be unintentionally duplicated. Duplication of files causes many problems for systems reliant on document management, chiefly because the additional (identical) files accept extra storage space, and must be handled like all other files, which results in greater network and resource utilization (with a concomitant increase in processing, search, and retrieval times). A tool to standardize the identification of duplicate files (based on their binary contents), as well as the identification of a primary duplicate (the original file) across multiple repositories in a manner that minimizes the time for identification, is disclosed.

BRIEF DESCRIPTION OF THE DRAWINGS

The drawings illustrate, by way of example only, embodiments of the present disclosure.

FIG. 3 is a diagram illustrating the TagDuplicate Commands tool.

DETAILED DESCRIPTION

Figure 1:
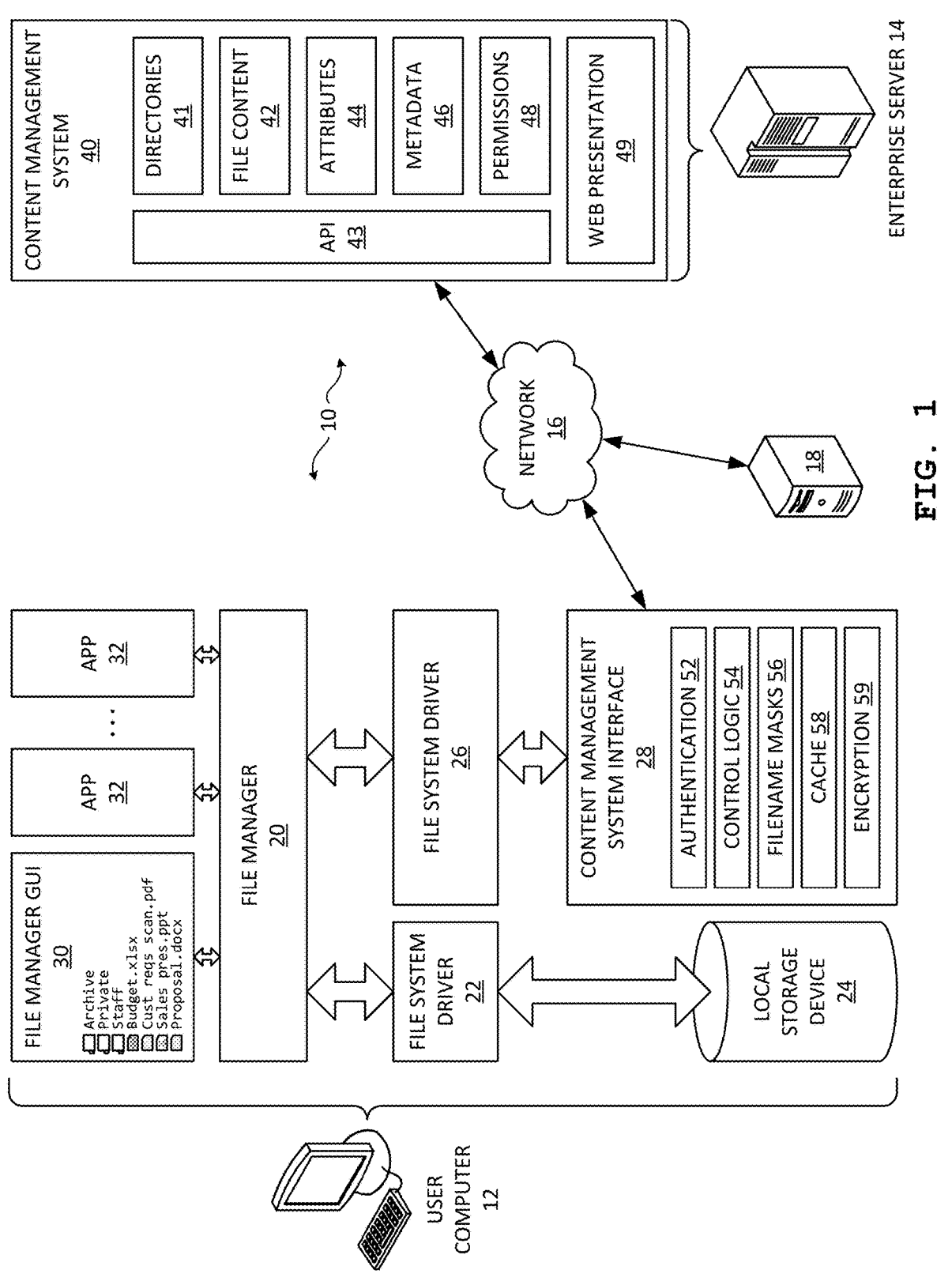
FIG. 1 is a block diagram of a networked computer system.

This disclosure concerns exposing a remote content management system to a server running the Shinydocs™ Cognitive Suite. Shinydocs™ Cognitive Suite is a content management interface system. Information will be transferred from the remote content management system to the Cognitive Suite, which will then be embellished using various automated methods to assign attributes to each of these documents (in the Cognitive Suite). Upon completion, these attributes will be re-synched with the metadata in the remote content management system. It is to be understood that, for the purposes of this disclosure, other systems which can query and update file attributes or metadata in a content management system may be used in place of Shinydocs™ Cognitive Suite.

A system for handling duplicate files is described herein. In one embodiment of the system, a hash is generated for each file, and duplicates may be tagged quickly through comparisons of hash values.

In one embodiment of the system, for a document which has at least one duplicate on the document management system, a master document may be identified amongst all copies of the document. This document may be selected from the duplicates based on a number of criteria, such as by location (with the master located in a master or otherwise specified area), by creation date (with the master having the earliest creation date), by presence or absence of modifications (with the master having more or fewer modifications than the duplicates), by creator (with the master document having been created by a specified person or a person chosen from a specified list of creators, or having not been created by a specified person or person chosen from a specified list of creators), by some other file metadata value being equal to, less than or greater than a specified value, or by some file metadata value being found or not found on a specified list. The master document may then be tagged as being the master document and identified duplicates may be replaced with operating system links or document management system links to the master document, with the links being hard links, soft links, or some other relationship pointer to the master document. The system may present a view showing the duplicate documents as being full copies of the master document while maintaining only a link to the master document.

In one embodiment of the system, a migration of data from an existing legacy system into a content management system may proceed with the use of a hashing and duplicate tagging system, with at least the following steps:

Files on the legacy system are hashed

Duplicates are located and tagged through comparisons of hashes

Master documents for all duplicated documents are identified

All files without duplicates are transferred into the content management system

All master documents are transferred into the content management system

For each non-master duplicate document in the legacy system, an appropriately located link to the appropriate master document is created within the destination content management system Some of these steps may be performed out of order or combined with other steps. Other ways to handle this migration are discussed in the document below.

FIG. 1 shows a networked computer system 10 according to the present invention. The system 10 includes at least one user computer device 12 and at least one server 14 connected by a network 16.

The user computer device 12 can be a device such as a desktop or notebook computer, a smartphone, tablet computer, and the like. The user computer device 12 may be referred to as a computer.

The server 14 is a device such as a mainframe computer, blade server, rack server, cloud server, or the like. The server 14 may be operated by a company, government, or other organization and may be referred to as an enterprise server or an enterprise content management (ECM) system.

The network 16 can include any combination of wired and/or wireless networks, such as a private network, a public network, the Internet, an intranet, a mobile operator's network, a local-area network, a virtual-private network (VPN), and similar. The network 16 operates to communicatively couple the computer device 12 and the server 14.

In a contemplated implementation, a multitude of computer devices 12 connect to several servers 14 via an organization's internal network 16. In such a scenario, the servers 14 store documents and other content in a manner that allows collaboration between users of the computer devices 12, while controlling access to and retention of the content. Such an implementation allows large, and often geographically diverse, organizations to function. Document versioning or/and retention may be required by some organizations to meet legal or other requirements.

The system 10 may further include one or more support servers 18 connected to the network 16 to provide support services to the user computer device 12. Examples of support services include storage of configuration files, authentication, and similar. The support server 18 can be within a domain controlled by the organization that controls the servers 14 or it can be controlled by a different entity.

The computer device 12 executes a file manager 20, a local-storage file system driver 22, a local storage device 24, a remote-storage file system driver 26, and a content management system interface 28.

The file manager 20 is configured for receiving user file commands from a user interface (e.g., mouse, keyboard, touch screen, etc.) and outputting user file information via the user interface (e.g., display). The file manager 20 may include a graphical user interface (GUI) 30 to allow a user of the computer 12 to navigate and manipulate hierarchies of folders and files, such as those residing on the local storage device 24. Examples of such include Windows® Internet Explorer and macOS® Finder. The file manager 20 may further include an application programming interface (API) exposed to one or more applications 32 executed on the computer 12 to allow such applications 32 to issue commands to read and write files and folders. Generally, user file commands include any user action (e.g., user saves a document) or automatic action (e.g., application's auto-save feature) performed via the file manager GUI 30 or application 32 that results in access to a file. The file manager GUI 30 and API may be provided by separate programs or processes. For the purposes of this disclosure, the file manager 20 can be one or more processes and/or programs that provide one or both of the file manager GUI 30 and the API.

The local-storage file system driver 22 is resident on the computer 12 and provides for access to the local storage device. The file system driver 22 responds to user file commands, such as create, open, read, write, and close, to perform such actions on files and folders stored on the local storage device 24. The file system driver 22 may further provide information about files and folders stored on the local storage device 24 in response to requests for such information.

The local storage device 24 can include one or more devices such as magnetic hard disk drive, optical drives, solid-state memory (e.g., flash memory), and similar.

The remote-storage file system driver 26 is coupled to the file manager 20 and is further coupled to the content management system interface 28. The file system driver 26 maps the content management system interface 28 as a local drive for access by the file manager 20. For example, the file system driver 26 may assign a drive letter (e.g., "H:") or mount point (e.g., "/Enterprise") to the content management system interface 28. The file system driver 26 is configured to receive user file commands from the file manager 20 and output user file information to the file manager 20. Examples of user file commands include create, open, read, write, and close, and examples of file information include file content, attributes, metadata, and permissions. The remote-storage file system driver 26 can be based on a user-mode file system driver.

The remote-storage file system driver 26 can be configured to delegate callback commands to the content management system interface 28. The callback commands can include file system commands such as Open, Close, Cleanup, CreateDirectory, OpenDirectory, Read, Write, Flush, GetFileInformation, GetAttributes, FindFiles, SetEndOfFile, SetAttributes, GetFileTime, SetFileTime, LockFile, UnLockFile, GetDiskFreeSpace, GetFileSecurity, and SetFileSecurity.

The content management system interface 28 is the interface between the computer 12 and the enterprise server 14. The content management system interface 28 connects, via the network 16, to a content management system 40 hosted on the enterprise server 14. As will be discussed below, the content management system interface 28 can be configured to translate user commands received from the driver 26 into content management commands for the remote content management system 40.

The content management system interface 28 is a user-mode application that is configured to receive user file commands from the file manager 20, via the driver 26, and translate the user file commands into content management commands for sending to the remote content management system 40. The content management system interface 28 is further configured to receive remote file information from the remote content management system 40 and to translate the remote file information into user file information for providing to the file manager 20 via the driver 26.

The remote content management system 40 can be configured to expose an API 43 to the content management system interface 28 to exchange commands, content, and other information with the content management system interface 28. The remote content management system 40 stores directory structures 41 containing files in the form of file content 42, attributes 44, metadata 46, and permissions 48. File content 42 may include information according to one or more file formats (e.g., ".docx", ".txt", ".dxf", etc.), executable instructions (e.g., an ".exe" file), or similar. File attributes 44 can include settings such as hidden, read-only, and similar. Metadata 46 can include information such as author, date created, date modified, tags, file size, and similar. Permissions 48 can associate user or group identities to specific commands permitted (or restricted) for specific files, such as read, write, delete, and similar.

The remote content management system 40 can further include a web presentation module 49 configured to output one or more web pages for accessing and modifying directory structures 41, file content 42, attributes 44, metadata 46, and permissions 48. Such web pages may be accessible using a computer's web browser via the network 16. The web presentation module 49 can be a problematic interface and is not discussed further here.

The content management system interface 28 provides functionality that can be implemented as one or more programs or other executable elements. The functionality will be described in terms of distinct elements, but this is not to be taken as limiting. In specific implementations, not all the functionality needs to be implemented.

The content management system interface 28 includes an authentication component 52 that is configured to prompt a user to provide credentials for access to the content management system interface 28 and for access to the remote content management system 40. Authentication may be implemented as a username and password combination, a certificate, or similar, and may include querying the enterprise server 14 or the support server 18. Once the user of the computer device 12 is authenticated, he or she may access the other functionality of the content management system interface 28.

The content management system interface 28 includes control logic 54 configured to transfer file content between the computer 12 and the server 14, apply filename masks, evaluate file permissions and restrict access to files, modify file attributes and metadata, and control the general operation of the content management system interface 28. The control logic 54 further affects mapping of remote paths located at the remote content management system 40 to local paths presentable at the file manager 20. Path mapping permits the user to select a file via the final manager 20 and have file information and/or content delivered from the remote content management system 40. In one example, the remote files and directories are based on a root path of "hostname/directory/subdirectory" that is mapped to a local drive letter or mount point and directory (e.g., "H:/hostname/directory/subdirectory").

The content management system interface 28 includes filename masks 56 that discriminate between files that are to remain local to the computer 12 and files that are to be transferred to the remote content management system 40. Temporary files may remain local, while master files that are based on such temporary files may be sent to the remote content management system 40. This advantageously prevents the transmission of temporary files to the remote content management system 40, thereby saving network bandwidth and avoiding data integrity issues (e.g., uncertainty and clutter) at the remote content management system 40.

The content management system interface 28 includes a cache 58 of temporary files, which may include working versions of files undergoing editing at the user computer device 12 or temporary files generated during a save or other operating of an application 32.

The content management system interface 28 includes an encryption engine 59 configured to encrypt at least the cache 58. The encryption engine 59 can be controlled by the authentication component 52, such that a log-out or time out triggers encryption of the cache 58 and successful authentication triggers decryption of the cache 58. Other informational components of the content management system interface 28 may be encrypted as well, such as the filename masks 56. The encryption engine 59 may conform to an Advanced Encryption Standard (AES) or similar.

Figure 2:
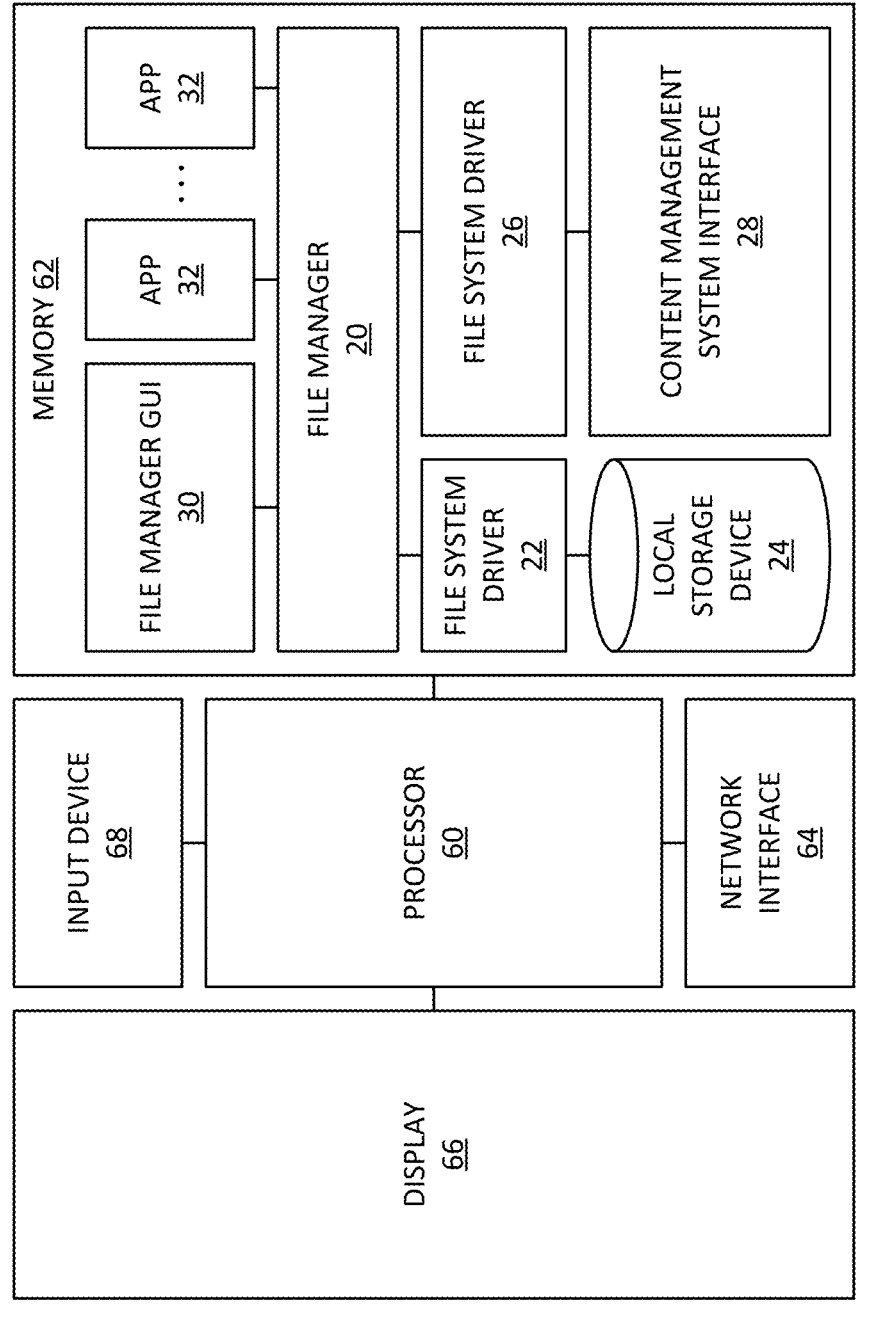
FIG. 2 is a block diagram of a user computer device.

FIG. 2 shows an example of a user computer device 12. The computer device 12 includes a processor 60, memory 62, a network interface 64, a display 66, and an input device 68. The processor 60, memory 62, network interface 64, display 66, and input device 68 are electrically interconnected and can be physically contained within a housing or frame.

The processor 60 is configured to execute instructions, which may originate from the memory 62 or the network interface 64. The processor 60 may be known as CPU. The processor 60 can include one or more processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the client computer (e.g., fixed hard drives) as well as removable components (e.g., removable memory cards). The memory 62 allows for random access, in that programs and data may be both read and written.

The network interface 64 is configured to allow the user computer device 12 to communicate with the network 16 (FIG. 1). The network interface 64 can include one or more of a wired and wireless network adaptors as well as a software or firmware driver for controlling such adaptor.

The display 66 and input device 68 form a user interface that may collectively include a monitor, a screen, a keyboard, keypad, mouse, touch-sensitive element of a touch-screen display, or similar device.

The memory 62 stores the file manager 20, the file system driver 26, and the content management system interface 28, as well as other components discussed with respect to FIG. 1. Various components or portions thereof may be stored remotely, such as at a server. However, for purposes of this description, the various components are locally stored at the computer device 12. Specifically, it may be advantageous to store and execute the file manager 20, the file system driver 26, and the content management system interface 28 at the user computer device 12, in that a user may work offline when not connected to the network 16. In addition, reduced latency may be achieved. Moreover, the user may benefit from the familiar user experience of the local file manager 20, as opposed to a remote interface or an interface that attempts to mimic a file manager.

Embodiments in this disclosure may be embodied as a tool (e.g., TagDuplicate) which runs within the Shinydocs™ Cognitive Toolkit software product, though another embodiment may embed the invention within a different product or as a standalone tool. Assuming that an Elasticsearch Index is available, or a similar index which was created from a crawl of the files in a repository or a collection of repositories (which can be a combination of file system, Box®, OpenText™ Content Server, OpenText™ Documentum, Microsoft® Exchange Server (attachments), IBM® FileNet, Microsoft® OneDrive, Microsoft® SharePoint), and given a calculated hash (a mathematical algorithm for mapping each binary file into a simple string of letters and numbers) is known for each of these files, based on a query the invention finds which of these hash values are duplicates of each other (i.e. for a given hash, there is at least one other hash with the exact same value) and marks such as "duplicate" within the Elasticsearch Index. Note that such duplicates—because they are determined based on a query—do not have to be across the entire Index—and they could be limited to be across an entire department (for example) if desired.

When identifying such duplicate hash values, one can also determine which is the "primary" duplicate based on an Administrator supplied parameter of the date field that this primary field should be selected by (which can be either the file creation date/time or the last modified date/time). When specified, only a single primary duplicate (for each unique set up duplicate hash values) will be so tagged. While in most cases the earliest value is selected by this method, we also make available the use case for selecting the latest value. Other possible criteria for selecting a primary duplicate are noted in the initial description above.

Since the tool TagDuplicate runs based on items to process query and since Elasticsearch allows us to access data based on aggregate values (i.e., "bucket" together all values based on a single field value), for extremely large datasets we propose the concept of calculating duplicates and primary duplicates based on the aggregate method (on the hash value). This method is very efficient when dealing with large datasets, when first calculating duplicates. While the Elasticsearch Bucket Aggregations is their domain, the usage of this approach for identifying duplicates and/or primary duplicates is a unique use-case that is our invention.

Further, as part of investigating methods to optimize the calculation time, we introduce the concept of a "match against query". The idea here is that the "items to process query" (i.e., the set items that you wish to consider re-calculating if they are duplicates) and the "match against query" (i.e., the set of items for which a hash value exists—whether it is a duplicate or not) are very different queries. This is particularly important for very large datasets combined with incremental changes—when there are already many items that are tagged as "duplicates" (or "primary-duplicates"), these should be excluded from being tagged as duplicates (since they are already so tagged).

Lastly, since the tool TagDuplicate can find duplicates, it by extension also has the ability to identify which files are NOT duplicated at all in the Index. If so configured, the value of "unique" can be written to the Index for all such files for which their hash value is indeed unique across the Index (or more accurately for the query used within the Index).

According to this disclosure, the TagDuplicate help file explains each of the options available and a description of each of these options for the Cognitive Toolkit TagDuplicate tool. A summary of these options is shown in the following table below:

| Options | Description |
| --- | --- |
| --duplicate-field-name <FIELD> | The name of the field that will identify the duplicate (Default: duplicate-{inspected-field}) |
| --tag-primary | Tag a primary duplicate (Default: false) |
| --tag-unique | Tag unique documents (Default: false) |
| --date-field <DATE_FIELD> | The name of the date field that will be used to determine the primary duplicate (Default: 'creationTimeUtc') |
| --sort-order <SORT_ORDER> | The sort order to be used in conjunction with date-field, valid options are 'ascending' and 'descending' (Default: ascending) |
| --inspected-field <INSPECTED_FIELD> | The name of the field that will be compared. (Default: 'hash') |
| --use-keyword <USE_KEYWORD> | Use the keyword field to filter (Default: true) |
| --aggregate | Use the aggregate method (Use for large datasets (Default: false) |
| --dry-run | DryRun (Default: false) |
| -q | --items-to-process-query <ITEMS_TO_PROCESS_QUERY> | Query for items to process (Required) |
| --match-against-query < ITEMS_TO_MATCH_AGAINST_QUERY> | Query for items to match against (Default: Match Everything) |
| --overwrite | Overwrite any previous result (Default: false) |
| -s | --silent | Turn off the progress bar (Default: false) |
| -s | --silent-n | --nodes-per-request <NODES_PER_REQUEST> | The number of nodes per request (Default: 100) |
| -t | --threads <THREADS> | Number of parallel processes to start (Default: 1) |
| --skip-errors | Skip re-processing errors (Default: false) |
| -u | --index-server-url <INDEX_SERVER_URL> | URL of the index server (Required) |

-continued

| Options | Description |
|---------|-------------|
| -i \| --index-name <INDEX_NAME> | Name of the index (Required) |
| --index-type <INDEX_TYPE> | Type name for index objects (Default: shinydocs) |
| --force | Forcefully remove/Suppress prompt for confirmation (Default: false) |
| -? \| -h \| --help | Show help information |

FIG. 3 is a diagram illustrating the TagDuplicate Commands tool. According to FIG. 3, a typical TagDuplicate command and the two supporting JSON files are shown where queries are used for items-to-process and match-against.

Figure 4:
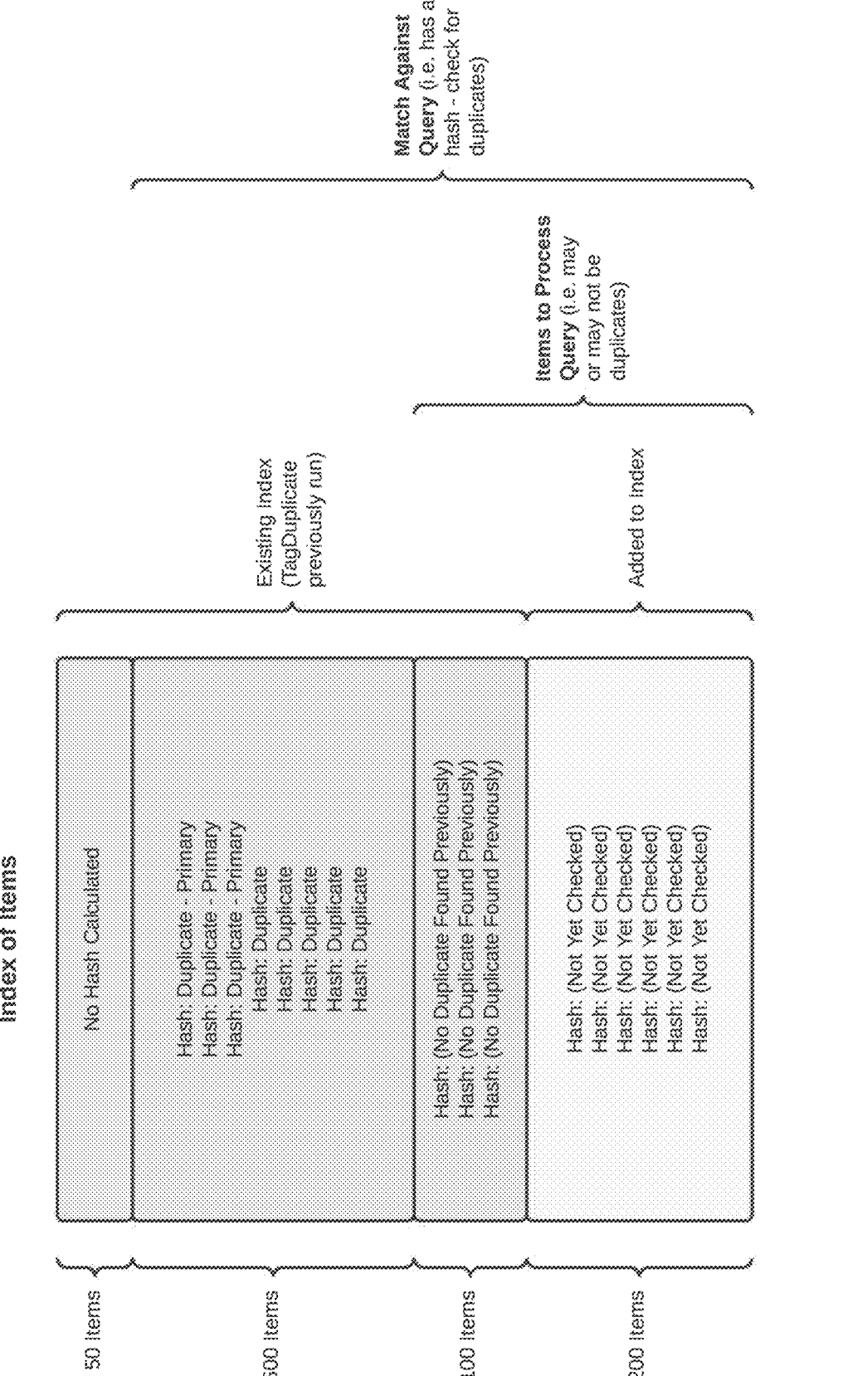
FIG. 4 is a diagram illustrating the TagDuplicate tool with items to process.

FIG. 4 is a diagram illustrating the TagDuplicate tool with items to process. FIG. 4 shows how, for an Index of 650 items, when an additional 200 items are added (and hashed), TagDuplicate with an Items to Process Query and a Match Against Query is used to select different sets of items for calculating duplicates.

Earlier versions of the TagDuplicate tool were found to be very inefficient in the calculation of duplicates for incremental increases in the Index. For example, if one had 100,000 items for which duplicates had already been identified, on an increase of a small amount (e.g., another 1,000 items), one had to recalculate duplicates across all 101,000 items which was incredibly inefficient. This led the way to the Items to Process and Match Against example as seen in FIG. 4 wherein only the new items added to the index need to be processed and items in the existing index are skipped.

Figure 5:
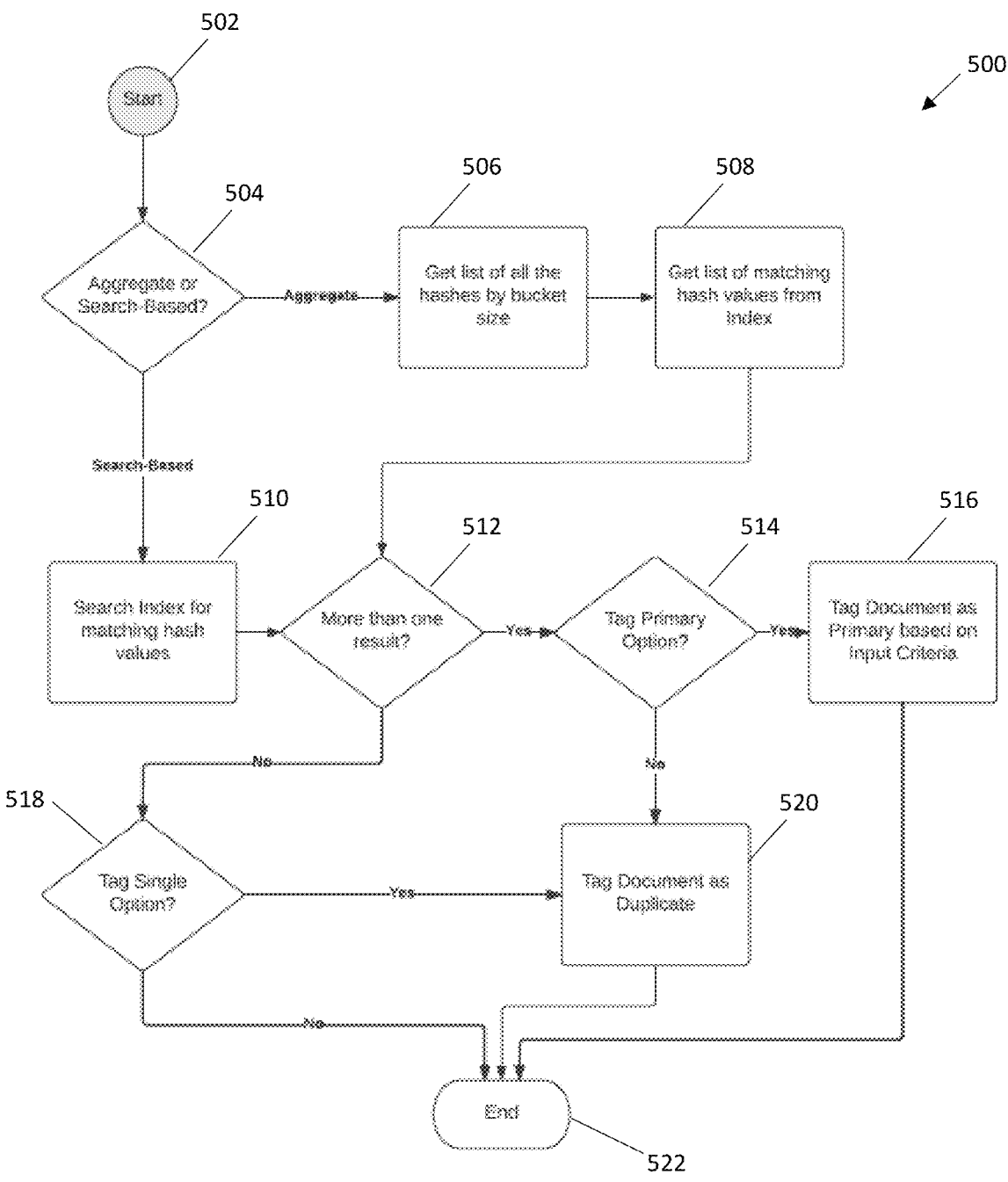
FIG. 5 is a process flow diagram for the TagDuplicate tool.

FIG. 5 is a process flow illustrating how the TagDuplicate algorithm works. According to FIG. 5, process flow 500 starts at step 502. The User chooses between Aggregate or Search-Based detection of duplicate files at step 504.

At step 504, the Aggregate method takes the Index as a whole and drops each hash into buckets (i.e., get list of all hashes by bucket size) at step 506 and then gets a list of matching hash values from the index at step 508 for processing.

At step 504, the Search-Based method pulls down an item and then searches the Index for items that have a similar hash value to compare against at step 510. After the step of finding a matching hash value, the two algorithms are the same and combine at step 512 to determine whether there is more than one result According to FIG. 5, if there is more than one result at step 512, the process then determines whether to tag the primary option at step 514. If the response is yes, the process then tags the document as the primary based on input criteria, at step 516. Thereafter, the process routes to the end at step 522.

According to FIG. 5, if there is a single result at step 512, the process then determines whether to tag a single option at step 518. If the answer is no, the process then routes to the end at step 522.

However, if the answer is Yes, at step 518, the process routes to step 520 to tag the document as a duplicate. If the tag primary option is no at step 514, the process also routes to step 520. After, step 520, the process also routes to the end at step 522.

Different content management systems may have the ability to identify duplicate documents, however certain systems may be limited in what repositories they are able to crawl and may not identify primary duplicates and may be slow. According to embodiments of this disclosure, Shinydocs™ can crawl and find duplicates across any number of disparate repositories with the ability to identify primary duplicates and faster duplicate detection.

Further, other content management system or tools may have the ability to identify duplicates across multiple repositories (e.g., Exchange, SharePoint, File Shares), however duplicate detection may be limited to metadata only. For example, certain tools may assume that if two files have the exact same size and are named the same (but in different locations) they must be duplicates. However, two files with the same size and name could in fact be entirely different files, which would only become evident upon inspecting their contents. According to this disclosure, Shinydocs™ uses hash algorithms (instead of metadata comparison) which is more accurate at determining duplicates. Using a hash algorithm will be able to catch duplicate cases where a file is copied and then renamed wherein the binary contents of the file will not change. Metadata detection may not catch this as a duplicate.

According to further embodiments, certain content management systems or tools may have the ability to identify duplicate documents, based on the hash of the file. However, these systems or tools may use the most recent duplicate when determining other duplicates. For example, if there is a "primary duplicate" and someone creates a copy, this makes it a new primary. Furthermore, these systems or tools may leverage the "Last Accessed Date" for much of their automation. According to this disclosure, Shinydocs™ can crawl and find duplicates across any number of disparate repositories with the ability to custom configure how to identify the primary duplicate.

According to embodiments of the disclosure, a computer-implemented method of identifying duplicate files across one or more repositories of a content management system data. The computer-implemented method comprises the steps of providing a computer processor, configuring the processor to couple with a network interface, configuring the processor, by a set of executable instructions storable in a memory, to operate a file manager storable in the memory, the file manager comprising an application program interface (API) for receiving a plurality of user file commands from at least one application executed by the processor and outputting user file information configuring the processor, by a set of executable instructions storable in a memory, to operate a file manager storable in the memory, the file manager comprising an application program interface (API) for receiving a plurality of user file commands from at least one application executed by the processor and outputting user file information; and operating a content management system interface storable in the memory, the content management system interface comprising control logic and configured to crawl and extract metadata from the content management system data to create an index, extract document binaries (based on the index) from the content management system in order to calculate a hash and extract full text and identify duplicates files based on their binary contents across the repositories with the ability to identify primary duplicates, wherein duplicate detection utilizes hashing algorithms in a manner that minimizes the time for identification.

According to the disclosure, the file manager further comprises a graphical user interface. The identification of a primary duplicate is performed based on comparing a file attribute or metadata value of one duplicate with a file attribute or metadata value of one or more other duplicates, with the attribute or metadata and comparison provided as input criteria. The identification of a primary duplicate is performed based on comparing a file attribute or metadata value of one duplicate with a provided list of values, with the attribute or metadata, list of values and comparison provided as input criteria.

According to the disclosure, the identification of duplicate files utilizes the TagDuplicate software tool. The step of calculating the hash and extracting full text further comprising adding the hash and full text to the index by using the AddHashAndExtractedText software tool. Furthermore, the identification of duplicate files is based on binary contents.

According to the further embodiments of the disclosure, a computer-implemented method of tagging duplicate files across one or more repositories of a content management system data is disclosed. This method uses software tool and a computer processor and comprises the steps of choosing between aggregate or search-based detection of duplicate files, if the selection is the aggregate detection, retrieving a list of all hashes by bucket size and retrieving a list of all matching hash values from an index, if the selection is search-based, searching an index for matching hash values, determining whether there is more than one search result, if the search result is a single option, determining whether to tag a single option, if tagging a single option, tagging the document as duplicate, if there is more than one result, determining whether to tag the primary option, if tagging the primary option, tagging the document as a primary duplicate based on input criteria, if not tagging the primary option, tagging the document as a duplicate file and retrieving and optionally displaying duplicate files.

According to the disclosure, the identification of a primary duplicate is performed based on comparing a file attribute or metadata value of one duplicate with a file attribute or metadata value of one or more other duplicates, with the attribute or metadata and comparison provided as input criteria. Furthermore, the identification of a primary duplicate is performed based on comparing a file attribute or metadata value of one duplicate with a provided list of values, with the attribute or metadata, list of values and comparison provided as input criteria. Furthermore, tagging of duplicate files utilizes the TagDuplicate software tool.

According to further embodiments of the disclosure, computer device for identifying duplicate files across one or more repositories of a content management system data is disclosed. The computer device comprising a processor configured to couple with a network interface, the processor configured, by a set of executable instructions storable in a memory, to operate a file manager storable in the memory, the file manager comprising an application program interface (API) for receiving a plurality of user file commands from at least one application executed by the processor and outputting user file information, and operating a content management system interface storable in the memory, the content management system interface comprising control logic and configured to crawl and extract metadata from the content management system data to create an index, based on the index, extract document binaries from the content management system in order to calculate hash and extract full text, and identify duplicate files across the repositories with the ability to identify primary duplicates wherein duplicate detection utilizes hashing algorithms in a manner that minimizes the time for identification.

Implementations disclosed herein provide systems, methods, and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code, or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A computer-implemented method of optimizing the access of a content management system by identifying duplicate files across one or more repositories of the content management system, the method comprising the steps of:

providing a computer processor configured to execute a file manager and a content management system interface;

executing the file manager to receive a plurality of user file commands via an application program interface (API) and to output corresponding user file information;

crawling, by the content management system interface, metadata from repositories of the content management system and generating an index of content items;

retrieving document binaries based on the index and calculating cryptographic hash values and extracting full text from the binaries;

storing the hash values and full text in the index;

identifying duplicate files across the repositories by comparing the calculated hash values;

selecting, via a tagging software tool, one of the duplicate files as a primary duplicate based on predefined file attributes or metadata values;

tagging non-primary duplicates accordingly; and generating a report or visual representation linking the duplicate files with their primary version, for display via a graphical interface or export for automated migration.

2. The method of claim 1, wherein the file manager further comprises a graphical user interface configured to display the visual representation of duplicate file relationships.

3. The method of claim 1, wherein the primary duplicate includes comparing a file attribute or metadata value of each duplicate with that of one or more other duplicates, using predefined comparison criteria.

4. The method of claim 1, wherein selecting the primary duplicate comprises comparing a file attribute or metadata value of each duplicate against a predefined list of preferred values.

5. A computer device for identifying and linking duplicate files across one or more repositories of a content management system in order to facilitate optimized data access on the content management system, the computer device comprising:

a processor configured to couple with a network interface, the processor further configured by a set of executable instructions stored in a memory to:

execute a file manager comprising an application program interface (API) for receiving a plurality of user file commands from at least one application and outputting corresponding user file information;

execute a content management system interface comprising control logic and configured to:

crawl and extract metadata from the content management system to generate an index;

retrieve document binaries from the content management system based on the index and calculate cryptographic hash values and extract full text;

store the hash values and full text in the index;

identify duplicate files across repositories by comparing the hash values;

designate one duplicate file as a primary duplicate based on predefined file attributes or metadata;

tag remaining duplicates accordingly using a tagging software tool; and generate a visual representation or report of the duplicate file relationships for display or export.

6. The device of claim 5, wherein the file manager further comprises a graphical user interface configured to present the visual representation of duplicate file relationships.

7. The device of claim 5, wherein the wherein the designation of the primary duplicate is based on comparing a file attribute or metadata value of each duplicate with those of one or more other duplicates, according to predefined comparison logic.

8. The device of claim 5, where the wherein the designation of the primary duplicate is based on comparing a file attribute or metadata value of each duplicate to a predefined list of values.

9. The method of claim 5, wherein the identifying the duplicate files is based at least in part on comparing binary content using calculated cryptographic hash values.

* * * * *